United States Patent
Letts

(10) Patent No.: US 7,612,120 B2
(45) Date of Patent: Nov. 3, 2009

(54) INSULATION BOARDS AND METHODS FOR THEIR MANUFACTURE

(75) Inventor: John B. Letts, Carmel, IN (US)

(73) Assignee: BFS Diversified Products, LLC

( * ) Notice: Subject to any disclaimer, the term of this patent is extended or adjusted under 35 U.S.C. 154(b) by 515 days.

(21) Appl. No.: 10/640,895

(22) Filed: Aug. 13, 2003

(65) Prior Publication Data

US 2004/0087674 A1    May 6, 2004

Related U.S. Application Data

(60) Provisional application No. 60/403,325, filed on Aug. 13, 2002.

(51) Int. Cl.
  *C08G 18/42* (2006.01)
(52) U.S. Cl. ............... 521/131; 521/159; 521/160; 521/170; 521/902
(58) Field of Classification Search ........... 521/50–189, 521/902
See application file for complete search history.

(56) References Cited

U.S. PATENT DOCUMENTS

| 5,387,618 A | * | 2/1995 | Smits | 521/131 |
| 5,472,990 A | | 12/1995 | Craig et al. | 521/155 |
| 5,837,742 A | | 11/1998 | Fishback | 521/172 |
| 6,140,383 A | | 10/2000 | Soukup et al. | 521/155 |

FOREIGN PATENT DOCUMENTS

| WO | WO 97/21764 | * | 6/1997 |
| WO | WO 00/24813 | | 5/2000 |
| WO | WO 02/072680 | | 9/2002 |

* cited by examiner

*Primary Examiner*—Irina S Zemel
(74) *Attorney, Agent, or Firm*—Sarah M. Jabbari; Arthur Reginelli

(57) ABSTRACT

A method for producing polyisocyanurate insulation foams, the method comprising contacting an A-side stream of reactants that includes an isocyanate with a B-side stream of reactants that include a polyol and a blowing agent, where the blowing agent includes isopentane and n-pentane in a substantial absence of cyclopentane.

4 Claims, No Drawings

INSULATION BOARDS AND METHODS FOR THEIR MANUFACTURE

This application gains benefit from U.S. Provisional Patent Application No. 60/403,325, filed on Aug. 13, 2003

FIELD OF THE INVENTION

This invention relates to the manufacture of polyisocyanurate insulation boards and more particularly toward the use of a certain blowing agent mixture.

BACKGROUND OF THE INVENTION

Polyurethane and polyisocyanurate foam insulation boards are commonly employed in the construction industry. These insulation boards are cellular in nature and typically include an insulating compound trapped within the cells of the foam. For example, it is common to produce insulation boards by employing hydrochlorofluorocarbons as a blowing agent, which thereby entraps these compounds within the cell network for purposes of improving the insulating ability of the foam.

Because fluorinated and chlorinated carbon compounds, such as hydrochlorofluorocarbons, may have a deleterious impact on the environment, many governments have or will prohibit the use of these compounds in the manufacture of foam. Many alternative blowing agents have been proposed including the use of certain hydrocarbons. In particular, pentane and isomers of pentane have been employed as blowing agents with a relative degree of commercial success. For example, blends including cyclopentane together with isopentane are commonly employed as a substitute for halogenated carbon compounds.

The presence of the cyclopentane has advantageously provided useful short-term insulation values (i.e., R values). Cyclopentane, however, is expensive. Also, cyclopentane is believed to partially solubilize polyurethane and polyisocyanurate polymers, and therefore its presence within the cells of the insulation board may deleteriously impact dimensional stability or deleteriously impact long-term R values. Furthermore, this ability to solubilize the foam material ultimately leads to poorer or higher diffusion rates which has a deleterious effect on long-term R values.

There is therefore a need to improve upon the hydrocarbon-based blowing agent systems currently employed in the manufacture of foams, particularly polyisocyanurate foams.

SUMMARY OF THE INVENTION

In general the present invention provides a method for producing polyisocyanurate insulation foams, the method comprising contacting an A-side stream of reactants that includes an isocyanate with a B-side stream of reactants that include a polyol and a blowing agent, where the blowing agent includes isopentane and n-pentane in a substantial absence of cyclopentane.

The present invention also includes a method for producing polyisocyanurate insulation foams, the method comprising contacting an isocyanate-reactive compound with an isocyanate compound in the presence of a blowing agent that includes both isopentane and n-pentane in the substantial absence of cyclopentane, where the isopentane is present in a weight fraction that is greater than the weight fraction of the n-pentane.

The present invention further includes a method for producing polyisocyanurate insulation foams, the method comprising contacting an A-side stream of reactants that includes an isocyanate with a B-side stream of reactants that include a polyol and a blowing agent, where the blowing agent includes isopentane and n-pentane in a substantial absence of cyclopentane, where the weight ratio of the isopentane to the n-pentane if from 7:1 to 1:1.

By employing a blowing agent system that includes isopentane and n-pentane in the substantial absence of cyclopentane, the present invention overcomes many of the problems associated with the prior art and allows for the economic and efficient manufacture of technologically useful insulation boards. To begin with, the preferred embodiments do not employ chlorinated or fluorinated carbon compounds. And, while the process employs hydrocarbon blowing agents, the substantial absence of cyclopentane provides for insulation boards that are not as susceptible to dimensional instability concerns that may by caused by cyclopentane. Moreover, the use of a blend of isopentane and n-pentane has surprisingly provided insulation boards with useful insulating efficiency despite the substantial absence of cyclopentane.

DETAILED DESCRIPTION OF ILLUSTRATIVE EMBODIMENTS

The manufacture of polyisocyanurate or polyurethane insulation boards according to the present invention employs a blowing agent system that includes isopentane and n-pentane in the substantial absence of cyclopentane.

In general, and in a manner that is conventional in the art, the insulation boards of the present invention are produced by developing a polyurethane and/or polyisocyanurate foam in the presence of a blowing agent. The foam is preferably prepared by contacting an A-side stream of reagents with a B-side stream of reagents and depositing the mixture or developing foam onto a laminator. As is conventional in the art, the A-side stream includes an isocyanate and the B-side includes an isocyanate-reactive compound.

The A-side stream typically only contains the isocyanate, but, in addition to isocyanate components, the A-side stream may contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4'diisocyanatobenzene. Preferred isocyanate components include polymeric Rubinate 1850 (Huntsmen Polyurethanes), polymeric Lupranate M70R, and polymeric Mondur 489N (Bayer).

The B-side stream, which contains isocyanate reactive compounds, may also include flame retardants, catalysts, emulsifiers/solubilizers, surfactants, blowing agents fillers, fungicides, anti-static substances, water and other ingredients that are conventional in the art.

The preferred isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Of these, a particularly preferred glycol is diethylene glycol. Suitable primary and secondary amines include, without limitation, ethylene diamine, and diethanolamine. The preferred polyol is a polyester polyol, and the present invention is preferably practiced in the appreciable absence of any polyether polyol. Most preferably, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, it is common to employ two or more catalysts to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants serve two purposes. First, they help to emulsify/solubilize all the components so that they react completely. Second, they promote cell nucleation and cell stabilization. Typically, the surfactants are silicone co-polymers or organic polymers bonded to a silicone polymer. Although surfactants can serve both functions, a more cost effective method to ensure emulsification/solubilization is to use enough emulsifiers/solubilizers to maintain emulsification/solubilization and a minimal amount of the surfactant to obtain good cell nucleation and cell stabilization. Examples of surfactants include Pelron surfactant 9868A, Goldschmidt surfactant B8469, and CK-Witco's L 6912. U.S. Pat. Nos. 5,686,499 and 5,837,742 are incorporated herein by reference to show various useful surfactants.

Suitable emulsifiers/solubilizers include DABCO Kitane 20AS (Air Products), and Tergitol NP-9 (nonylphenol+9 moles ethylene oxide).

Flame Retardants are commonly used in the production of polyurethane and polyisocyanurate foams, especially when the foams contain flammable blowing agents such as pentane isomers. Useful flame retardants include tri(monochloropropyl) phosphate, tri-2-chloroethyl phosphate, phosphonic acid, methyl ester, dimethyl ester, and diethyl ester. U.S. Pat. No. 5,182,309 is incorporated herein by reference to show useful blowing agents.

The blowing agents employed in practicing this invention include a blend of isopentane and n-pentane in the substantial absence of cyclopentane. In addition to isopentane and n-pentane, the blowing agent may optionally include other blowing agents such as alkanes, (cyclo)alkanes, hydrofluorocarbons, hydrochlorofluorocarbons, fluorocarbons, fluorinated ethers, alkenes, alkynes, carbon dioxide, and noble gases.

Suitable alkanes and (cyclo)alkanes include neopentane, n-butane, cyclobutane, methylcyclobutane, isobutane, propane, cyclopropane, methylcyclopropane, n-hexane, 3-methylpentane, 2-methylpentane, cyclohexane, methylcyclopentane, n-heptane, 2-methylheptane, 3-ethylpentane, 2,2,3-trimethylbutane, 2,2-dimethylpentane, cycloheptane, methylcyclohexane and 2,3-dimethylbutane.

Suitable hydrofluorocarbons include 1,1,1,2-tetrafluoroethane (HFC 134a), 1,1,1,4,4,4hexafluorobutane (HFC 356), pentafluoroethane (HFC 125), 1,1-difluoroethane (HFC 152a), trifluoromethane (HFC 23), difluoromethane (HFC 32), trifluoroethane (HFC 143) and 1,1,1,3,3-pentafluoropropane (HFC 245FA), fluoromethane.

Suitable hydrochlorofluorocarbons include chlorodifluoromethane (HCFC 22), 1-chloro-1,1-difluoroethane (HCFC 142b), 1,1,1-trifluoro-2,2-dichloroethane (HCFC 123) and dichlorofluoromethane (HCFC 21).

Suitable fluorocarbons include perfluoromethane (R14), perfluorocyclobutane, perfluorobutane, perfluoroethane and perfluoropropane.

Suitable fluorinated ethers include bis-(trifluoromethyl) ether, trifluoromethyl difluoromethyl ether, methyl fluoromethyl ether, methyl trifluoromethyl ether, bis(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether and 1,1,1,3,3-hexafluoroprop-2-yl fluoromethyl ether.

Suitable noble gases include krypton, argon and xenon. Preferred blowing agents include those having zero ozone depletion potential.

While other blowing agents may also be added, it is preferred that the blowing agent mixture is devoid of halogenated blowing agents, and it is especially preferred that the blowing agent mixture is essentially devoid of hydrofluorocarbons and hydrochlorofluorocarbons.

With respect to the amount of isopentane to n-pentane, it is preferred to employ an isopentane to n-pentane weight ratio of 9:1 to about 1:2, more preferably from 7:1 to 1:1, more preferably from about 5:1 to 1.5:1, even more preferably from about 4:1 to 1.7:1, still more preferably 3:1 to about 3:1, and even more preferably 2.7:1 to about 2.3:1. Preferably, the blend includes a greater weight fraction of isopentane. While other blowing agents can be employed, it is preferred that the blowing agents comprise at least 90% weight of the mixture of isopentane and n-pentane, and even more preferably at least about 95% of the mixture of isopentane and n-pentane.

In order to achieve the benefits of this invention, there should be a substantial absence of cyclopentane. In other words, the ingredients, especially the blowing agents, should not contain more than an insubstantial amount of cyclopentane. The terms substantial absence or insubstantial amount refer to that amount (or less) of cyclopentane that will not have an appreciable impact on the characteristics of the blowing agent mixture or the polyisocyanurate insulation boards. For example, it is known that a threshold amount of cyclopentane will impact the dimensional stability of the polyisocyanurate insulation boards. That amount of cyclopentane that will not impact the characteristics of the polyisocyanurate insulations boards is an insubstantial amount of cyclopentane.

In a preferred embodiment, the ingredients, especially the blowing agents, will include only trace amounts or less of cyclopentane. More preferably, the blowing agent mixture may only include less than 1.0 weight % cyclopentane, more preferably less than 0.5 weight % cyclopentane, and even more preferably less than 0.1 weight % cyclopentane.

Practice of the present invention generally does not alter the amount of any ingredient employed or the relative ratios of any of the ingredients. In general, an excess of isocyanate to polyol is employed, especially where an isocyanurate foam is desired. For example, where a polymeric isocyanate is employed as the A-side reactant, about 150 to about 300 parts by weight of polymeric isocyanate per 100 parts by weight of polyol is employed (php).

The blowing agent mixture, which includes the mixture of isopentane and n-pentane, as well as any additional blowing agents that may be employed, should be employed in an amount from about 10 to about 40 parts by weight blowing agent php, and even more preferably in an amount from about 15 to about 35 parts by weight blowing agent php.

With regard to the other ingredients, it is preferred to employ from about 0.5 to about 6 parts by weight surfactant php, from about 0.1 to about 2 parts by weight water php and from about 0 to about 25 parts by weight flame retardant php. The amount of catalyst employed may vary greatly depending on the type or nature of the catalyst, but it is typically common to employ from about 1 to about 7 parts by weight metal salt php and about 0.1 to about 3 parts by weight amine php.

Besides employing the mixture of isopentane and n-pentane in the substantial absence of cyclopentane, practice of this invention does not necessarily alter the procedures employed in preparing foam insulation boards.

For example, the process employed may include conventional low pressure mixing whereby the B-side reactants and blowing agent are mixed under atmospheric pressure and at temperatures of about 18° C. to about 29° C. The B-side mixture is then delivered to a mix head at a temperature of about 18° C. to about 29° C. and a pressure of about 25 psi to about 200 psi. The A-side stream is likewise delivered to the same mix head at a temperature of about 18° C. to about 38° C. and a pressure of about 25 psi to about 200 psi. The A-side and B-side reactants undergo mixing at this mix head and the resulting mixture becomes a developing foam that is deposited onto a laminator. The laminator may include a facer material onto which the developing foam is deposited. A second facer material may optionally be applied to the upper surface of the developing foam. The ultimate size of the resultant foam board is manipulated by adjusting the height of the moving form, i.e., restrained rise, by adjusting the sides of the moving form to a desired width, and by cutting the continuous foam product to a desired length.

In a preferred embodiment, the process includes high pressure mixing whereby the B-side reactants and blowing agents are mixed within a dynamic pin mixer at pressures in excess of about 80 psi at temperatures in excess of 10° C. This particular procedure is disclosed in a co-pending international patent that designates the United States (PCT/US02/06823), which is incorporated herein by reference. After mixing at the pin mixer, the B-side reactants are heated to a temperature of about 16° C. to about 29° C., and the pressure is increased to a pressure of about 1,800 to about 2,400 psi prior to delivery to the mix head where the temperature increases to about 27° C. to about 35° C.

The A-side is fed to the mix head at a temperature of about 29° C. to about 35° C. and a pressure of about 1,800 to about 2,400 psi. After mixing at the mix head, the developing foam is likewise deposited onto a laminator.

Various modifications and alterations that do not depart from the scope and spirit of this invention will become apparent to those skilled in the art. This invention is not to be duly limited to the illustrative embodiments set forth herein.

What is claimed is:

1. A method for producing isocyanurate insulation foams, the method comprising:
    (i) forming a B-side stream of reactants including a polyol and a blowing agent blend, where the blowing agent blend includes isopentane and n-pentane at a weight ratio of isopentane to n-pentane of about 1:1 to about 2.7:1 in the substantial absence of cyclopentane, where said step of forming includes introducing the polyol and the blowing agent within a pin mixer under a pressure in excess of about 80 psi and a temperature in excess of about 10° C.;
    (ii) increasing the temperature of the B-side stream of reactants to a temperature of about 16° C. to about 29° C. and a pressure of about 1800 psi to about 2400 psi;
    (iii) after said step of increasing, delivering the B-side stream of reactants to a mix head, where the temperature of the B-side stream of reactants is increased to about 27° C. to about 35° C.;
    (iv) introducing an A-side stream of reactants to the mix head at a temperature of about 29° C. to about 35° C. and a pressure of about 1800 to about 2400 psi to thereby mix with the B-side stream and form a mixture of polyisocyanurate ingredients;
    (v) depositing the mixture of polyisocyanurate ingredients onto a laminator and allowing the mixture of polyisocyanurate ingredients to form a developing foam.

2. The method of claim 1, where the laminator includes a facer material onto which the developing foam is deposited.

3. The method of claim 2, further comprising the step of providing a second facer material to the upper surface of the foam.

4. The method of claim 3, further comprising the step of cutting the foam to a desired length.

* * * * *

UNITED STATES PATENT AND TRADEMARK OFFICE
CERTIFICATE OF CORRECTION

| | | |
|---|---|---|
| PATENT NO. | : 7,612,120 B2 | Page 1 of 1 |
| APPLICATION NO. | : 10/640895 | |
| DATED | : November 3, 2009 | |
| INVENTOR(S) | : John B. Letts | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 60 days.

Signed and Sealed this

Nineteenth Day of October, 2010

David J. Kappos
*Director of the United States Patent and Trademark Office*